United States Patent
Ahmed et al.

(10) Patent No.: US 8,843,440 B2
(45) Date of Patent: Sep. 23, 2014

(54) SYNCHRONIZING DATABASE PROJECTS WITH PARTNER PROJECTS

(75) Inventors: Haroon Ahmed, Bellevue, WA (US); Craig Allen Lee, Issaquah, WA (US); Aditya Unnithan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 230 days.

(21) Appl. No.: 13/011,824

(22) Filed: Jan. 21, 2011

(65) Prior Publication Data

US 2012/0191650 A1 Jul. 26, 2012

(51) Int. Cl.
*G06F 7/00* (2006.01)
*G06F 17/00* (2006.01)
*G06F 17/30* (2006.01)

(52) U.S. Cl.
CPC .............................. *G06F 17/30297* (2013.01)
USPC ........................................................ 707/612

(58) Field of Classification Search
USPC .................................. 707/624, 803, 809, 612
See application file for complete search history.

(56) References Cited

U.S. PATENT DOCUMENTS

| | | | |
|---|---|---|---|
| 5,870,765 A | 2/1999 | Bauer et al. | |
| 7,111,023 B2 | 9/2006 | Norcott | |
| 7,124,151 B1 | 10/2006 | Choi | |
| 7,660,809 B2 | 2/2010 | Cortright et al. | |
| 7,788,225 B2 | 8/2010 | Fish et al. | |
| 2008/0147704 A1* | 6/2008 | Godwin et al. | 707/102 |
| 2008/0201362 A1* | 8/2008 | Multer et al. | 707/103 R |
| 2009/0048894 A1* | 2/2009 | Simpson et al. | 705/9 |
| 2010/0114831 A1 | 5/2010 | Gilbert et al. | |
| 2011/0208785 A1* | 8/2011 | Burke et al. | 707/803 |

OTHER PUBLICATIONS

Synchronizing Database Schemas among Developers—Retrieved Date: Nov. 9, 2010 http://stackoverflow.com/questions/783798/synchronizing-database-schemas-among-developers, (2 pages).
Automatic Database Synchronization with a Royalty-Free .Net Component—Retrieved Date: Nov. 9, 2010 http://www.perpetuumsoft.net/SQL-Schema-Sync-API.aspx, (5 pages).

* cited by examiner

*Primary Examiner* — Alexey Shmatov
(74) *Attorney, Agent, or Firm* — Nicholas Chen; David Andrews; Micky Minhas

(57) ABSTRACT

A solution authoring tool that includes an authoring environment that allows for the authoring of multiple projects of a solution including a database project that has a schema and a partner project that has a reference to the schema. When the database project is built and deployed, the database schema is made ready for runtime. When the partner project is built and deployed, the schema reference is provided within the partner software such that the partner software may interface with the database schema at runtime. To reduce or eliminate database schema drift at development time causing runtime errors at runtime, a model bus at least partially synchronizes changes made to the schema in the database project to the schema reference in the partner project, and vice versa.

9 Claims, 3 Drawing Sheets

SYNCHRONIZING DATABASE PROJECTS WITH PARTNER PROJECTS

BACKGROUND

Software applications, components and services may be authored using a management container that managers source code, data connections, and references. Such a container will be referred to hereinafter as a "project". VISUAL STUDIO® uses such containers and calls such containers projects, but other mechanisms may also use projects in the broader sense of the word. A project is organized as part of a solution, which can contain multiple projects that interface with each other at development time. Each project may be built and deployed to form a corresponding application that interfaces with other applications (formulated by building and deploying the other projects in the solution) during runtime. For instance, in a two-tiered application, there might be a client application and a server application at runtime. At development time, the two-tiered solution may include the corresponding client project and the corresponding server project.

Many applications now involve some type of interaction with a database. Developers write applications that use data and the interface to this data is the database schema. In order to interact with the data, the application will typically contain a local, translated representation of the database's schema useful for application development. This representation is usually a textual representation. It is inevitable that the database's schema will change over time. This database schema change is termed herein "drift". Because the schema is not typically represented as compilable code, the application project cannot help the developer detect when database schema drift occurs at development time. If the developer does not respond to this database schema drift, then the application will likely experience runtime errors. It can be quite difficult to resolve this misunderstanding of the database schema by the application project.

BRIEF SUMMARY

At least one embodiment described herein relates to a solution authoring tool that includes an authoring environment that allows for the authoring of multiple projects of a solution including a database project that has a schema and a partner project that has a reference to the schema. When the database project is built and deployed, the database schema is made ready for runtime. When the partner project is built and deployed, the schema reference is provided within the partner software such that the partner software may interface with the database schema at runtime.

To reduce or eliminate database schema drift at development time causing runtime errors at runtime, a model bus at least partially synchronizes changes made to the schema in the database project to the schema reference in the partner project, and potentially also at least partially synchronizes changes made to the schema reference in the partner project to the schema in the database project.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a solution authoring tool is described that includes an authoring environment that allows for the authoring of multiple projects of a solution including a database project that has a schema and a partner project that has a reference to the schema. A model bus at least partially synchronizes the schema in the database project with the schema reference in the partner project, as either has changes. First, some introductory discussion regarding computing systems will be described with respect to FIG. 1. Then, the embodiments of the exposing the solution authoring tool will be described with respect to FIGS. 2 through 4.

Figure 1:
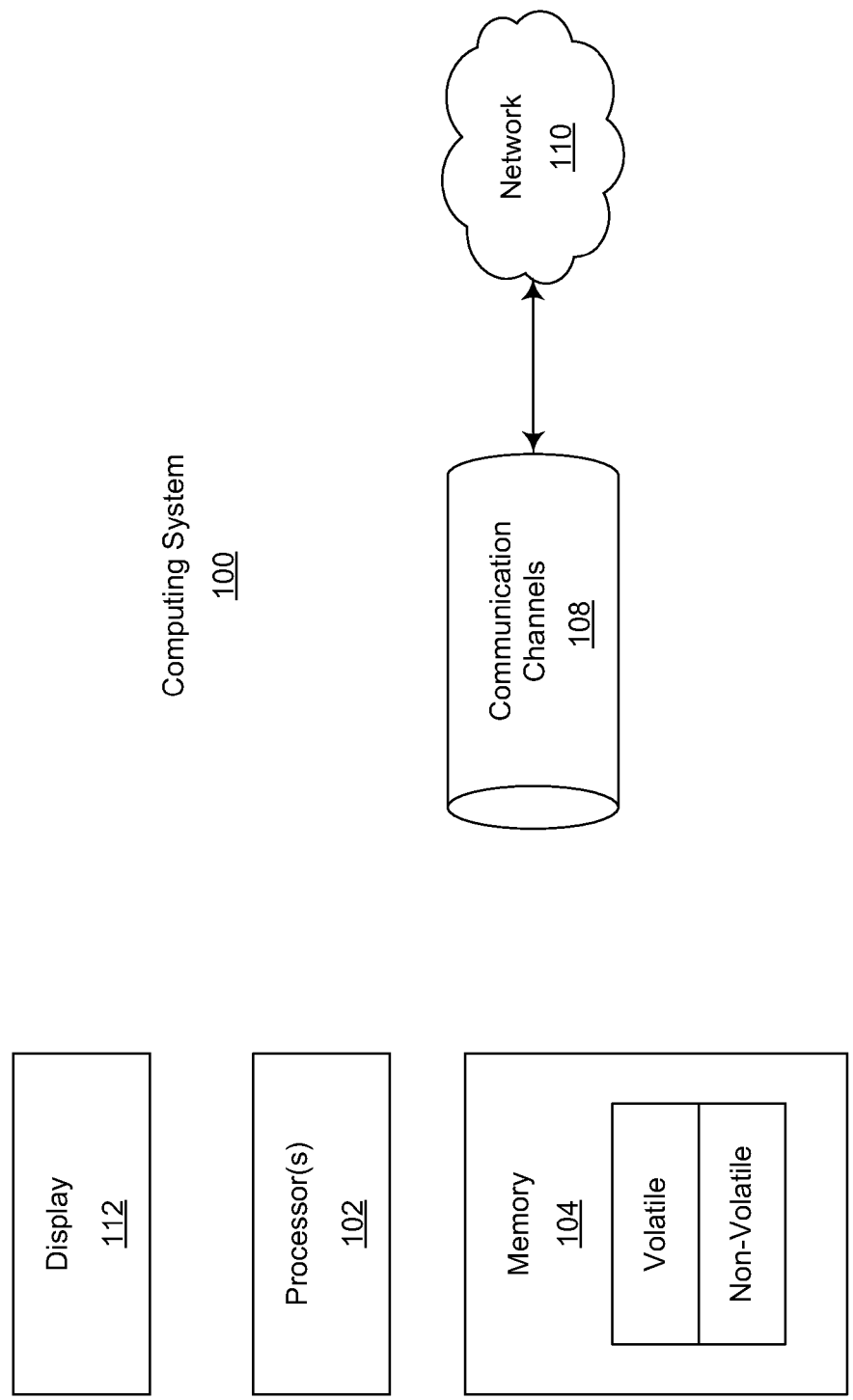
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems. As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system may also include a display 112 that may display information to a user.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
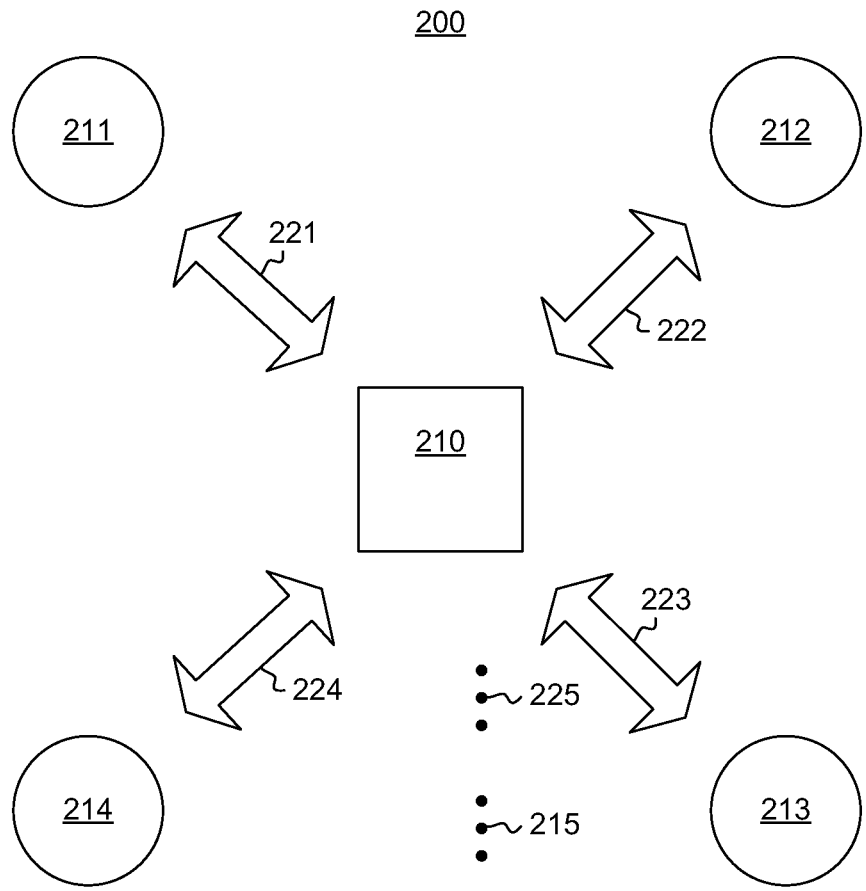
FIG. 2 illustrates a solution authoring tool which may be formulated by a computing system such as the computing system of FIG. 1.

FIG. 2 illustrates a solution authoring tool 200 which may be formulated by a computing system such as the computing system 100 of FIG. 1. When implemented in software, the solution authoring tool 200 may be formulated by the computing system accessing a computer program product comprising one or more computer storage media that have thereon computer-executable instructions, and then executing the computer-executable instructions using one or more processors of the computing system.

A "project" is a logical container that contains source code, data connections and/or references. A solution constitutes a collection of projects that interface with each other at development time. The solution authoring environment 200 allows for the authoring of at least one of multiple projects of a solution of interacting projects. One of the benefits of organizing projects into solutions, however, is that the projects may each be authored by different individuals. Accordingly, there is no requirement the most or all of the projects are authored within the solution authoring environment 200.

The solution authoring environment includes a database project 210 and at least one partner project 211. There may be as few as a single partner project interfacing with the database project. However, in the illustrated embodiment, there are four partner projects 211 through 214 interfacing with the database project 210. The ellipses 215 represent that there may be any number (from as few as one, with no upper limit) of partner projects interfacing with the database project. For easier reference, the database project is abstractly represented as square-shaped, whereas each partner project is abstractly represented as a circular shape.

Each of the partner projects has a model bus endpoint through which changes are propagated between the partner project and the database project. For instance, model bus endpoint 221 intermediates between partner project 211 and database project 210, model bus endpoint 222 intermediates between partner project 212 and database project 210, model bus endpoint 223 intermediates between partner project 213 and database project 210, and model bus endpoint 224 intermediates between partner project 214 and database project 210. The ellipses 225 represent that there may other model bus endpoints as well for each of any additional partner project that is represented by ellipses 215.

Figure 3:
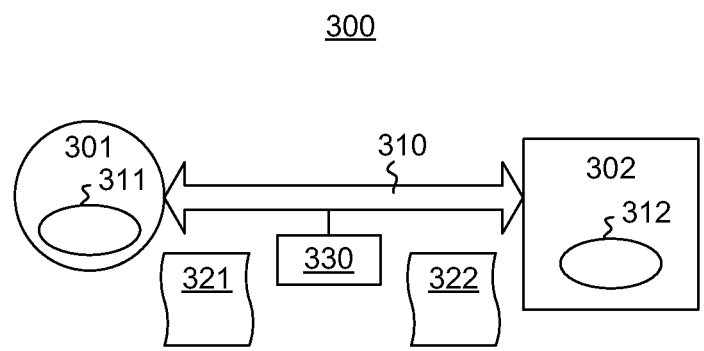
FIG. 3 illustrates a more simplified example of a single partner project interfacing with a database project through a model bus.

Each model bus endpoint is configured to intermediate by propagating at least a portion of changes made to the schema in the database project to the schema reference in the corresponding partner project for that endpoint. Furthermore, each model bus endpoint is configured to intermediate by propagating at least a portion of changes made to the schema reference in the corresponding partner project to the schema in the database project. FIG. 3 illustrates a more simplified example of a single partner project 301 interfacing with a database project 302 through a model bus that includes a single model bus endpoint 310. As an example, the partner project 301 may be an example of the partner project 211 of FIG. 2, and the database project 302 may be an example of the database project 210 of FIG. 2. In that case, the model bus endpoint 310 may be an example of the model bus endpoint 221 of FIG. 2. Each of the model bus endpoints 221 through 224 may behave as described for the model bus endpoint 310 with respect to the corresponding partner projects 211 through 214. The model bus endpoints 221 through 224 may be endpoints in the same model bus, but the principles described herein are not limited to that. They could also be model bus endpoints corresponding to two or more model buses.

The database project 302 has a corresponding schema 312. Once the database project 302 is built, compiled and deployed, the schema would be the database schema with which partner components (such as applications) may interact. The partner project 301 has a corresponding schema reference 311. Once the partner project 301 is built, compiled and deployed, the schema reference 311 may be used to interface with the database schema.

During development time, the schema 312 of the database project 302 may change. The model bus endpoint 310 determines, for at least some of the changes made to the schema 312 in the database project 302, whether the change warrants propagation to the schema reference 311 in the partner project 301. In the illustrated embodiment, a data contract 322 specifies which schema changes are to be propagated to the schema reference 311 and/or how propagation is to occur. In other words, the data contract 322 specifies how to translate changes in the schema 312 to corresponding changes in the schema reference 311, where such changes result in a schema reference 311 and schema 312 that are compatible. In some cases, the changes to the schema reference 311 may be different than the changes to the schema 312 so as to maintain compatibility between the schema reference 311 and the schema 312.

Likewise during development time, the schema reference 311 of the partner project 301 may change. The model bus endpoint 310 may also determine, for at least some of the changes made to the schema reference 311 in the partner project 301, whether the change warrants propagation to the schema 312 of the database project 302. In the illustrated embodiment, a data contract 321 specifies which schema reference changes are to be propagated to the schema 312 and/or how propagation is to occur. In other words, the data contract 321 specifies how to translate changes in the schema reference 311 to corresponding changes in the schema 312, where such changes result in a schema reference 311 and schema 312 that are compatible. Once again, in some cases, the changes to the schema 312 may be different than the changes to the schema reference 311 so as to maintain compatibility between the schema reference 311 and the schema 312.

A bus configuration mechanism 330 may allow for an adjustment to the types of changes that are that are to be propagated and/or how changes to the schema or schema reference are translated to the other of the schema or schema reference. Referring back to FIG. 2, the changes propagated by the corresponding model bus endpoints 221 through 224 may differ depending on the nature of the partner project, the developer preference. Thus bus configuration mechanism 330 allows for appropriate customization of change propagation.

Figure 4:
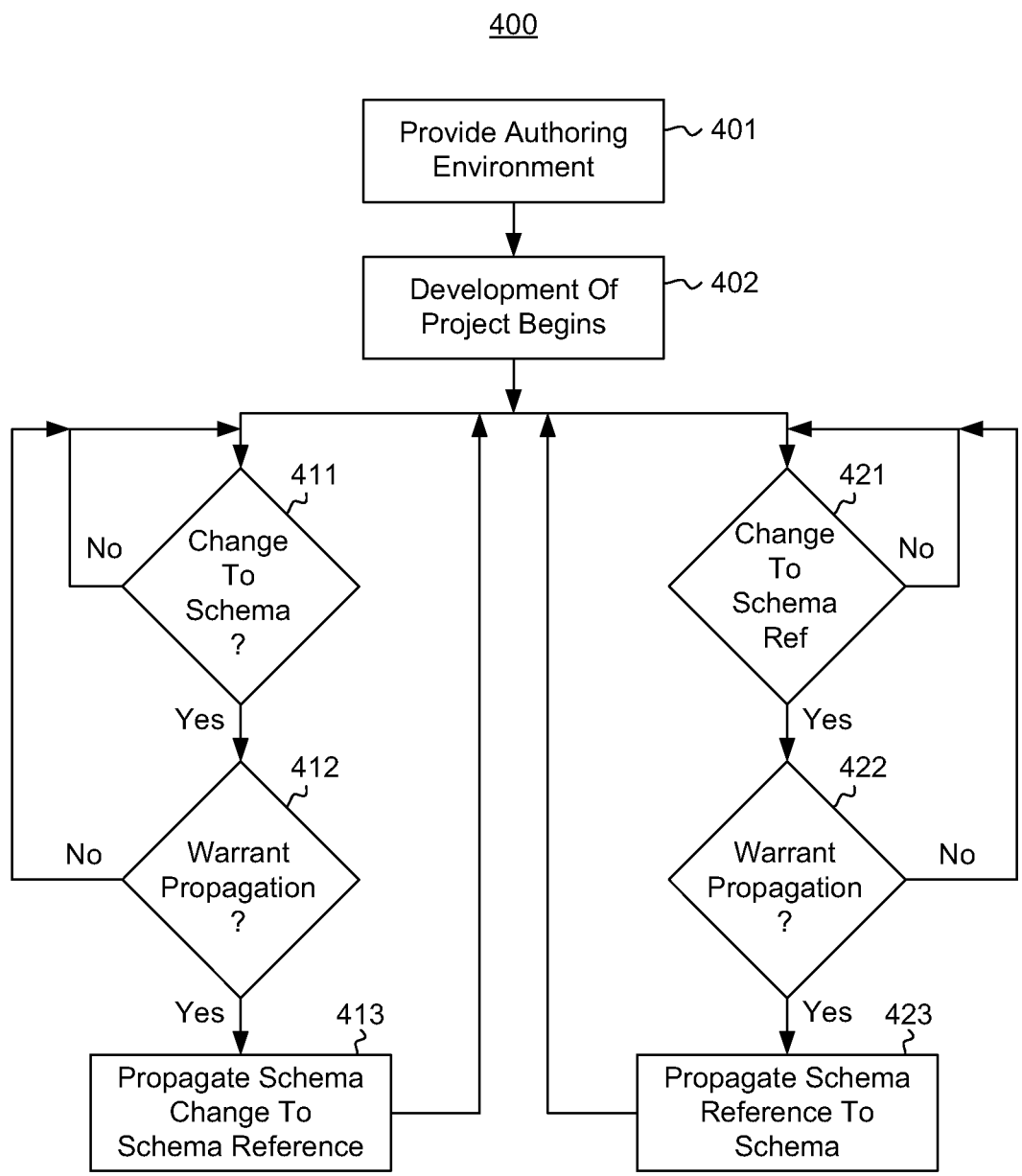
FIG. 4 illustrates a flowchart of a method for facilitating development of a database solution.

FIG. 4 illustrates a flowchart of a method 400 for facilitating development of a database solution. The method 400 will be described with respect to the environment 200 of FIG. 2, and with respect to the environment 300 of FIG. 3. The method 400 is initiated with the providing of an authoring environment (act 401). For instance, the authoring environment 200 of FIG. 2, or the authoring environment 300 of FIG. 3, may be provided. The authoring environment 200 may be used to develop the database project 210 and/or any one or more of the partner projects 211 through 214. Likewise, the authoring environment 300 may be used to develop the database project 302 and/or the partner project 301.

Then, as development occurs for the project (which could be a database project or a partner project) (act 402), one or more changes are encountered. As each change is detected to the schema of the database project (Yes decision block 411), then it is determined whether the change warrants propagation to the schema reference of the partner project (decision block 412). If a change is warranted (Yes in decision block 412), then the change to the schema is propagated to the schema reference (act 413). On the other hand, as each change is detected to the schema reference of the partner project (Yes decision block 421), then it is determined whether the change warrants propagation to the schema of the database project (decision block 422). If a change is warranted (Yes in decision block 422), then the change to the schema reference is propagated to the schema (act 423).

Thus, an effective mechanism for keeping database projects and partner projects consistent during solution development as the schema and schema reference change is described. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for facilitating development of a database solution, the method comprising:
 an act of a computer system, which includes one or more processors, establishing a first bi-directional model bus between a first partner project and a database project that are hosted within an authoring environment, and a second bi-directional model bus between a second partner project and the database project, the first bi-directional model bus being configured to propagate schema changes between a database schema within the database project and a first database schema reference within the first partner project, the second bi-directional model bus being configured to propagate schema changes between the database schema within the database project and a second database schema reference within the second partner project, each database schema reference being derived from and comprising a different format than the database schema, wherein each bi-directional model bus includes one or more corresponding data contracts that specify:
 how to translate schema changes that have occurred to the database schema into a format that is compatible with the corresponding database schema reference, and how to translate schema reference changes that have occurred to the corresponding database schema reference into a format that is compatible with the database schema; and which changes to the database schema warrant propagation to the corresponding database schema reference, and which changes to the database schema reference warrant propagation to the corresponding database schema;

during development with the authoring environment, an act of the computer system detecting that a plurality of first changes have occurred to the database schema within the database project and, as a result:

determining, automatically based on the one or more corresponding data contracts of the first bi-directional model bus and the corresponding data contracts of the second bi-directional model bus, that a first one or more of the first changes warrants propagation to the first and second database schema references;

determining, automatically based on the one or more data contracts, that a second one or more of the first changes does not warrant propagation to the first and second database schema references;

communicating the first one or more of the first changes to the first partner project through the first bi-directional model bus for application to the first database schema reference, including translating the first one or more of the first changes into a format that is compatible with the first database schema reference, while refraining from communicating the second one or more of the first changes to the first partner project, as specified by the one or more data contracts of the first bi-directional model bus; and communicating the first one or more of the first changes to the second partner project through the second bi-directional model bus for application to the second database schema reference, including translating the first one or more of the first changes into a format that is compatible with the second database schema reference, while refraining from communicating the second one or more of the first changes to the second partner project, as specified by the one or more data contracts of the second bi-directional model bus, wherein communicating the first one or more of the first changes to the second partner project comprises sending data of a different format than data communicated to the first bi-directional model bus when communicating the first one or more of the first changes to the first partner project; and during development with the authoring environment, an act of the computer system detecting a second plurality of changes have occurred to the first database schema reference within the first partner project and, as a result:

determining, automatically based on the one or more data contracts, that a first one or more of the second changes warrants propagation to the database schema;

determining, automatically based on the one or more data contracts, that a second one or more of the second changes does not warrant propagation to the database schema; and communicating the first one or more of the second changes to the database project through the bi-directional model bus for application to the database schema, including translating the first one or more of the second changes into a format that is compatible with the database schema, while refraining from communicating the second one or more of the second changes to the database project, as specified by the one or more data contracts.

2. The method of claim 1, wherein each bi-directional model bus includes a bus configuration mechanism that is configured to enable configuration of one or more types of changes that are to be propagated between the database schema within the database project and each corresponding database schema reference within each corresponding partner project.

3. The method of claim 1, wherein each bi-directional model bus includes a bus configuration mechanism that is configured to enable configuration of how schema changes are to be translated when propagated between the database schema within the database project and each corresponding database schema reference within each corresponding partner project.

4. A computer program product comprising one or more recordable-type computer-readable storage devices having stored thereon computer-executable instructions that, when executed by one or more processors of a computer system, are configured to cause the computer system to implement a method for facilitating development of a database solution, including the following:

establishing a first bi-directional model bus between a first partner project and a database project that are hosted within an authoring environment, and a second bi-directional model bus between a second partner project and the database project, the first bi-directional model bus being configured to propagate schema changes between a database schema within the database project and a first database schema reference within the first partner project, the second bi-directional model bus being configured to propagate schema changes between the database schema within the database project and a second database schema reference within the second partner project, each database schema reference being derived from and comprising a different format than the database schema, wherein each bi-directional model bus includes one or more data contracts that specify:

how to translate schema changes that have occurred to the database schema into a format that is compatible with the corresponding database schema reference, and how to translate schema reference changes that have occurred to the corresponding database schema reference into a format that is compatible with the database schema; and which changes to the database schema warrant propagation to the corresponding database schema reference, and which changes to the database schema reference warrant propagation to the corresponding database schema;

during development with the authoring environment, detecting that a plurality of first changes have occurred to the database schema within the database project and, as a result:

determining, automatically based on the one or more corresponding data contracts of the first bi-directional model bus and the corresponding data contracts of the second bi-directional model bus, that a first one or more of the first changes warrants propagation to the first and second database schema references;

determining, automatically based on the one or more data contracts, that a second one or more of the first changes does not warrant propagation to the first and second database schema references;

communicating the first one or more of the first changes to the first partner project through the first bi-directional model bus for application to the first database schema reference, including translating the first one or more of the first changes into a format that is compatible with the first database schema reference, while refraining from communicating the second one or more of the first changes to the first partner project, as specified by the one or more data contracts of the first bi-directional model bus; and communicating the first one or more of the first changes to the second partner project through the second bi-directional model bus for application to the second database schema reference, including translating the first one or more of the first changes into a format that is compatible with the second database schema reference, while refraining from communicating the second one or more of the first changes to the second partner project, as specified by the one or more data contracts of the second bi-directional model bus, wherein communicating the first one or more of the first changes to the second partner project comprises sending data of a different format than data communicated to the first bi-directional model bus when communicating the first one or more of the first changes to the first partner project; and during development with the authoring environment, detecting a second plurality of changes have occurred to the first database schema reference within the first partner project and, as a result:

determining, automatically based on the one or more data contracts, that a first one or more of the second changes warrants propagation to the database schema;

determining, automatically based on the one or more data contracts, that a second one or more of the second changes does not warrant propagation to the database schema; and communicating the first one or more of the second changes to the database project through the bi-directional model bus for application to the database schema, including translating the first one or more of the second changes into a format that is compatible with the database schema, while refraining from communicating the second one or more of the second changes to the database project, as specified by the one or more data contracts.

5. The computer program product of claim 4, wherein each bi-directional model bus includes a bus configuration mechanism that is configured to enable configuration of one or more types of changes that are to be propagated between the database schema within the database project and each corresponding database schema reference within each corresponding partner project.

6. The computer program product of claim 4, wherein each bi-directional model bus includes a bus configuration mechanism that is configured to enable configuration of how schema changes are to be translated when propagated between the database schema within the database project and each corresponding database schema reference within each corresponding partner project.

7. A computer system, comprising:
one or more processors; and
one or more computer-readable media having stored thereon computer-executable instructions that, when executed the one or more processors, cause the computer system to implement a method for facilitating development of a database solution, including the following:

establishing a first bi-directional model bus between a first partner project and a database project that are hosted within an authoring environment, and a second bi-directional model bus between a second partner project and the database project, the first bi-directional model bus being configured to propagate schema changes between a database schema within the database project and a first database schema reference within the first partner project, the second bi-directional model bus being configured to propagate schema changes between the database schema within the database project and a second database schema reference within the second partner project, each database schema reference being derived from and comprising a different format than the database schema, wherein each bi-directional model bus includes one or more corresponding data contracts that specify:

how to translate schema changes that have occurred to the database schema into a format that is compatible with the corresponding database schema reference, and how to translate schema reference changes that have occurred to the corresponding database schema reference into a format that is compatible with the database schema; and which changes to the database schema warrant propagation to the corresponding database schema reference, and which changes to the database schema reference warrant propagation to the corresponding database schema;

during development with the authoring environment, detecting that a plurality of first changes have occurred to the database schema within the database project and, as a result:

determining, automatically based on the one or more corresponding data contracts of the first bi-directional model bus and the corresponding data contracts of the second bi-directional model bus, that a first one or more of the first changes warrants propagation to the first and second database schema references;

determining, automatically based on the one or more data contracts, that a second one or more of the first changes does not warrant propagation to the first and second database schema references; and communicating the first one or more of the first changes to the first partner project through the first bi-directional model bus for application to the first database schema reference, including translating the first one or more of the first changes into a format that is compatible with the first database schema reference, while refraining from communicating the second one or more of the first changes to the first partner project, as specified by the one or more data contracts of the first bi-directional model bus; and communicating the first one or more of the first changes to the second partner project through the second bi-directional model bus for application to the second database schema reference, including translating the first one or more of the first changes into a format that is compatible with the second database schema reference, while refraining from communicating the second one or more of the first changes to the second partner project, as specified by the one or more data contracts of the second bi-directional model bus, wherein communicating the first one or more of the first changes to the second partner project comprises sending data of a different format than data communicated to the first bi-directional model bus when communicating the first one or more of the first changes to the first partner project; and during development with the authoring environment, detecting a second plurality of changes have occurred to the first database schema reference within the first partner project and, as a result:
- determining, automatically based on the one or more data contracts, that a first one or more of the second changes warrants propagation to the database schema;
- determining, automatically based on the one or more data contracts, that a second one or more of the second changes does not warrant propagation to the database schema; and
- communicating the first one or more of the second changes to the database project through the bi-directional model bus for application to the database schema, including translating the first one or more of the second changes into a format that is compatible with the database schema, while refraining from communicating the second one or more of the second changes to the database project, as specified by the one or more data contracts.

8. The computer system of claim 7, wherein each bi-directional model bus includes a bus configuration mechanism that is configured to enable configuration of one or more types of changes that are to be propagated between the database schema within the database project and each corresponding database schema reference within each corresponding partner project.

9. The computer system of claim 7, wherein each bi-directional model bus includes a bus configuration mechanism that is configured to enable configuration of how schema changes are to be translated when propagated between the database schema within the database project and each corresponding database schema reference within each corresponding partner project.

* * * * *